(No Model.)
A. W. KENT.
SEPARATING FOREIGN SUBSTANCES FROM INDIA RUBBER WASTE.
No. 281,769. Patented July 24, 1883.
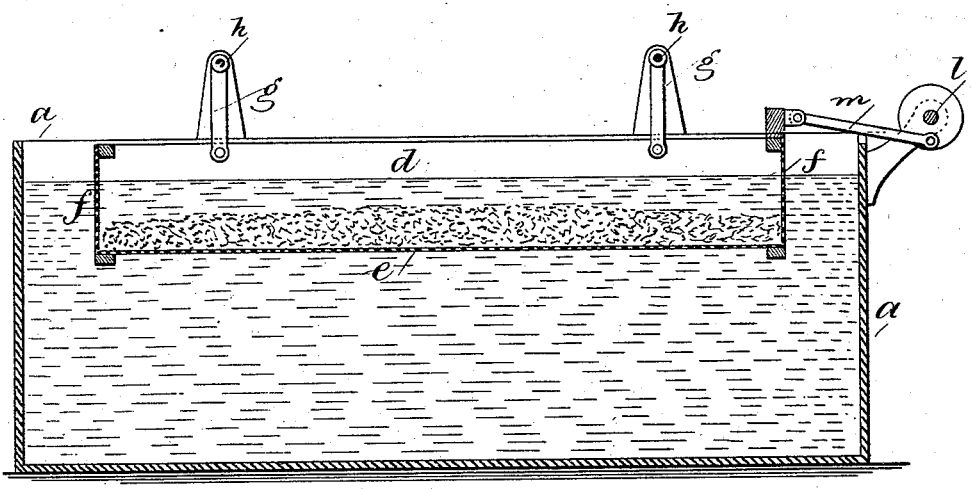
Witnesses
Chas H. Smith
J. Staib
Inventor
Alexander W. Kent
per Lemuel W. Serrell
atty

UNITED STATES PATENT OFFICE.

ALEXANDER W. KENT, OF BLOOMINGDALE, NEW JERSEY, ASSIGNOR TO ALFRED ROBINSON, OF SAME PLACE.

SEPARATING FOREIGN SUBSTANCES FROM INDIA-RUBBER WASTE.

SPECIFICATION forming part of Letters Patent No. 281,769, dated July 24, 1883.

Application filed November 22, 1882. (No model.)

*To all whom it may concern:*

Be it known that I, ALEXANDER W. KENT, of Bloomingdale, Passaic county, New Jersey, have invented an Improvement in Separating Foreign Substances from India-Rubber Waste, of which the following is a specification.

Efforts have been made to separate dirt, sand, cotton and wool fiber, and other substances from old india-rubber shoes, in order that the rubber may be used again. In endeavoring to do this the rubber has been ground, and efforts made to sift the dirt and other foreign substances from the rubber. In grinding up the rubber the material becomes more or less adhesive, and the sand, grit, fiber, and other materials adhere to the same to a considerable extent, and the rubber and such foreign substances do not separate by gravity, and the efforts heretofore made to use the rubber of old shoes and similar articles a second time have not been fully successful.

My invention is an improved process for the removal of foreign substances from such old rubber; and it consists in the following successive steps: The old rubber is ground or cut up into small particles or fragments by a rubber-grinding machine consisting usually of a pair of rolls. I prefer that the grinding be done wet. The foreign substances are not as liable to adhere to the rubber when moist as they are when dry. I, however, do not limit myself in this particular, but intend to grind or cut the rubber either wet or dry, and by any suitable means. The rubber in its comminuted state is next subjected to a washing and separating action in a sieve suspended in water. This washing has a fourfold action: First, the water partially floats the rubber, and by the agitation separates the particles of rubber from one another, and gives room for the grit, dirt, and heavier matter to separate; second, the sieve supports the rubber as the grit and heavy foreign matter subside and separate from the rubber and pass through the sieve; third, the attrition of the particles of rubber in the presence of water causes dirt, sand, and foreign matter to be rubbed off; and, fourth, the water lessens the adhesion of the fibrous materials to the rubber and causes them to float toward the surface, and thereby separate from the rubber; hence the rubber, when removed, is free from foreign substances to a large extent. It may, however, be ground a second time and again washed.

In the drawing I have shown by a vertical section the separating apparatus employed by me. The box $a$ is adapted to contain water, and within it is suspended the sieve that receives the rubber to be separated from foreign substances. The sieve is formed with closed sides $d$ and perforated bottom $e$ and ends $f$. The links $g$ are pivoted to the sides $d$ and extend to the cross-shafts $h$, that are supported at their ends in bearings upon the water-box $a$, and a crank-shaft, $l$, and connecting-rod $m$ to the sieve serve to give to the said sieve an endwise and up-and-down movement in the water. The ends $f$ of the sieve, being perforated or formed of wire-cloth, as well as the bottom, allow the water to flow freely through the sieve and between the particles of rubber as they are agitated within the sieve by the motion given to the same in the water, and thus the foreign matters are separated, both those that float off the rubber as well as those that fall down by gravity from the rubber through the sieve and subside in the bottom of the water-box.

I do not claim washing crude rubber or gutta-percha in a sieve within water for the removal of sand and other impurities. In preparing old rubber shoes for use a second time, there is present in the rubber a material that is not found in the crude rubber—viz., the fibrous fabric forming the lining of the shoes—and this is liable to retain dirt and grit; hence in the washing operation it is important that the detached fibrous materials be allowed to float off and the heavy matters to subside, while the rubber itself is agitated upon the sieve.

I claim as my invention—

The method herein specified of treating the india-rubber of old shoes previous to use a second time, consisting in grinding or subdividing the old shoes, and then agitating the material in water within a sieve that supports the rubber, and allows the heavier substances to subside and the loose fibers of the lining to wash away, substantially as set forth.

Signed by me this 7th day of November, A. D. 1882.

ALEXANDER W. KENT.

Witnesses:
P. S. CLEARNAN,
MILTON S. HILLER.